May 3, 1960 D. W. BREARLEY 2,935,252

ELAPSED TIME COMPUTER

Filed Nov. 30, 1956 11 Sheets-Sheet 1

INVENTOR.
DONALD W. BREARLEY

BY G. R. Gugger
AGENT

May 3, 1960 D. W. BREARLEY 2,935,252

ELAPSED TIME COMPUTER

Filed Nov. 30, 1956 11 Sheets-Sheet 2

May 3, 1960 D. W. BREARLEY 2,935,252

ELAPSED TIME COMPUTER

Filed Nov. 30, 1956 11 Sheets-Sheet 4

May 3, 1960 D. W. BREARLEY 2,935,252

ELAPSED TIME COMPUTER

Filed Nov. 30, 1956 11 Sheets-Sheet 5

May 3, 1960 D. W. BREARLEY 2,935,252

ELAPSED TIME COMPUTER

Filed Nov. 30, 1956 11 Sheets-Sheet 7

May 3, 1960 D. W. BREARLEY 2,935,252

ELAPSED TIME COMPUTER

Filed Nov. 30, 1956 11 Sheets-Sheet 8

May 3, 1960 D. W. BREARLEY 2,935,252

ELAPSED TIME COMPUTER

Filed Nov. 30, 1956 11 Sheets-Sheet 9

May 3, 1960 D. W. BREARLEY 2,935,252

ELAPSED TIME COMPUTER

Filed Nov. 30, 1956 11 Sheets-Sheet 10

May 3, 1960 D. W. BREARLEY 2,935,252

ELAPSED TIME COMPUTER

Filed Nov. 30, 1956 11 Sheets-Sheet 11

United States Patent Office 2,935,252
Patented May 3, 1960

2,935,252

ELAPSED TIME COMPUTER

Donald W. Brearley, Vestal, N.Y., assignor to International Business Machines Corporation, New York, N.Y., a corporation of New York Application November 30, 1956, Serial No. 625,263

14 Claims. (Cl. 235—61.6)

This invention relates to improvements in elapsed time recorders, particularly to that type of recorder which can compute the elapsed time between two successive operations and wherein printing and punching mechanisms are provided for recording the actual time of an operation as well as the elapsed time between operations on a card form. An elapsed time recorder of this type is disclosed in assignee's copending application, Serial No. 398,795, filed December 17, 1953, and the present invention, solely as a convenience in disclosure of the invention, has been shown in the drawings and will be described hereinafter as applied to a machine of this type.

The present invention consists of an improvement which enables the recorder to automatically adjust itself for an abutting shifts type of situation where a certain period prior to and after the coincident start and finish time is allotted to registering "in" and "out." This is an extremely important and useful advance in the time recording art in view of the increasing number of day and night shift operations being employed by industry today. Although this problem has existed for some time, recorders in the past have been constructed for one shift operation and the time recording of abutting shifts could not be overlapped thus requiring the recording of one shift to be completed before recording for the next shift could begin.

Accordingly, the main object of the invention is to provide an improved elapsed time recorder having means to allow recording the actual time on the card yet calculate the elapsed time in accordance with the designated pay period. For example, at five o'clock, the oncoming swing shift making entries anytime during the allotted punch in period prior to five should have the actual time registered on their cards. However, the coded perforations punched in their cards which control the calculation of elapsed time should conform to the allowable pay period (five o'clock) to facilitate calculating the payable elapsed time. The outgoing day shift presents a similar problem wherein the elapsed time mechanism must be held through the punch out period, while the recording of actual time is allowed to function normally.

A further object of the present invention is to provide an improved elapsed time recorder having means for controlling the elapsed time mechanism so that at the beginning of the swing or night shift punch in period the elapsed time mechanism is advanced to five o'clock and held through said "in" period and the ensuing day shift punch out period after which it is similarly advanced at the end of said "out" period so as to again agree with the actual time.

In keeping with the two objects recited above, a further object of the present invention is to provide a rapid time advance mechanism for sequentially advancing the elapsed time mechanism ahead a plurality of minutes taking actually only a few seconds to complete the advance.

A still further object of the present invention is to provide a rapid time advance mechanism as in the preceding object including settable means for varying the amount of advancement that may be made.

Other objects of the invention will be pointed out in the following description and claims and illustrated in the accompanying drawings, which disclose, by way of examples, the principle of the invention and the best mode which has been contemplated of applying that principle.

Figure 1:
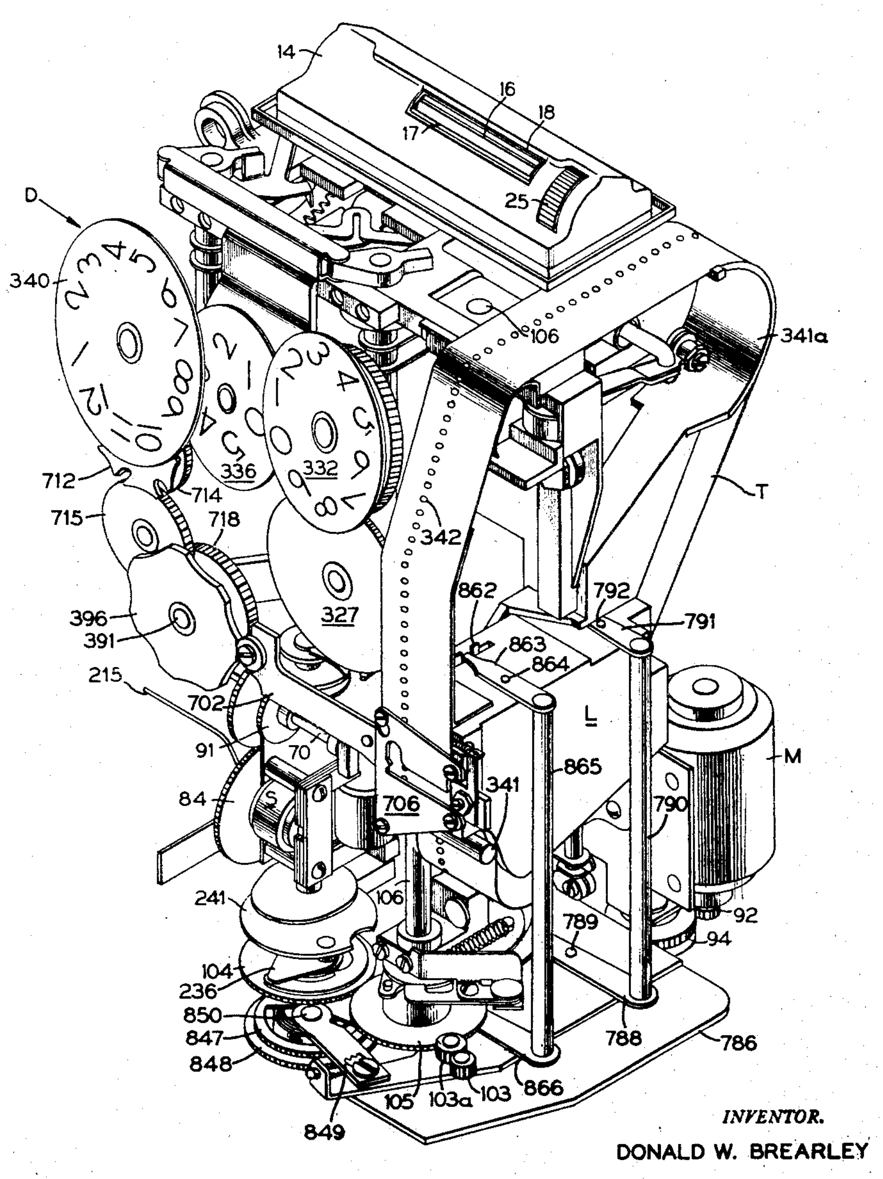
Fig. 1 is an isometric view of a preferred elapsed time recorder, with the covers removed, having the present invention applied thereto.

Referring to the drawings, Fig. 1 shows the general organization of an elapsed time recorder embodying the present invention. The recorder is disclosed in detail in the afore-mentioned copending application and only those portions of it will be shown and described in detail here as is believed necessary for a clear understanding of the present invention.

In general, the lower half of the machine comprises the drive motor mechanism M for driving all of the individual units of the recorder and also a synchronous motor mechanism S which controls the operation of the timekeeping units. In the middle front portion and along the right side of the machine is disposed the program tape mechanism T for controlling the periods of time during which elapsed time should be computed. In the upper half of the recorder behind the dial mechanism D are located the current time and elapsed time mechanisms, the punching unit for punching positioning and checking holes as well as start and stop time punchings, and a sensing unit for sensing the time punchings. The card feeding mechanism is arranged to transport the card from the card receiver unit, which extends across the top of the machine, down and then across the middle of the machine and downward again into a stacker box at the lower left-hand corner of the machine.

The card (not shown) usually used with the present type of recorder would normally be prepunched with employee name, number, social security code, location or department number and year; all of which would be interpreted at the top of the card. When the card is inserted in the "in" slot 17, punchings representing the setting of the elapsed time wheels are punched, the start time and date are printed, the punching of a positioning hole is made and a checking hole is punched. When the card is inserted in the "out" slot 18, punchings representing the setting of the elapsed time wheels are again punched, the stop time and date are printed, the punching of another positioning hole and checking hole are made and the elapsed time is printed. The elapsed time, of course, represents the difference in hours and minutes between the times of insertion in the "in" and "out" slots of the card receiver.

Since the present improvement is concerned with the setting of the elapsed time type wheels, the only portions of the recorder that will be described in detail are those portions which are necessary for operation of the elapsed time type wheels.

*General operation of the recorder*

Figure 3:
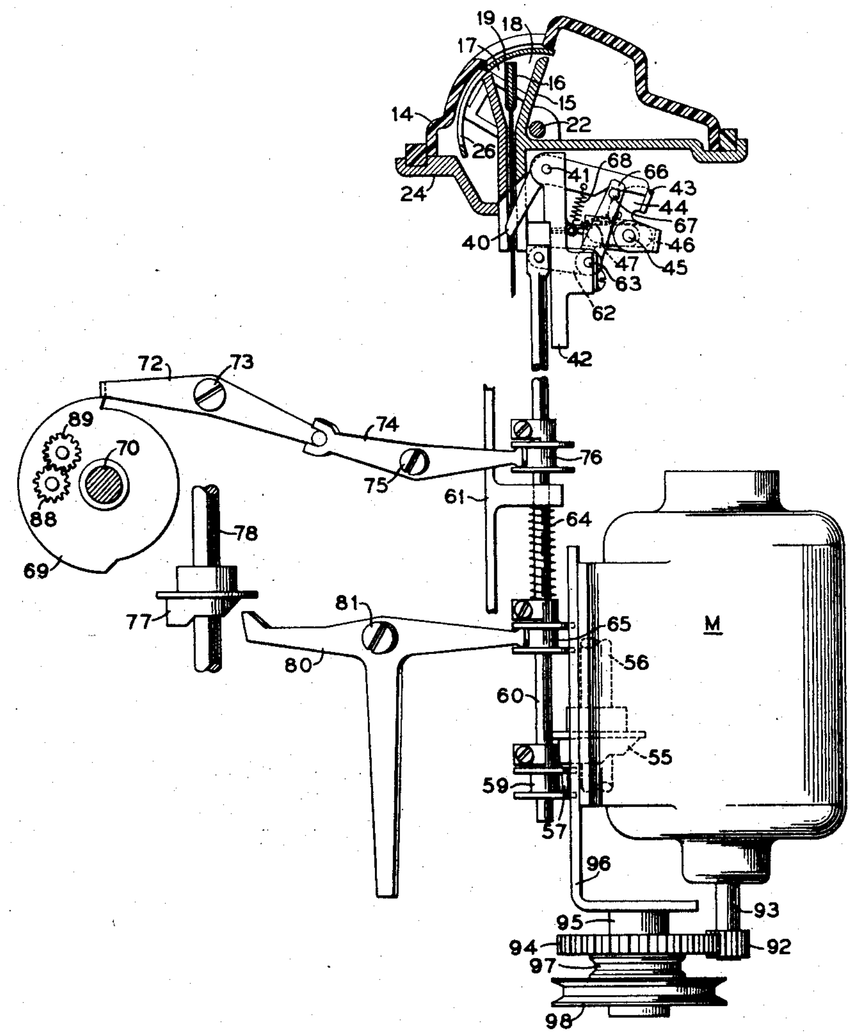
Fig. 3 is a right-hand view of the drive motor start and stop levers.
Figure 17:
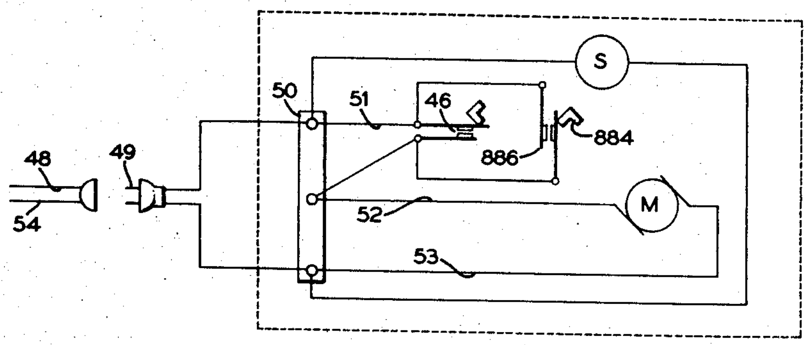
Fig. 17 is a wiring diagram.

Referring to Fig. 3, when a card is inserted in either the "in" or "out" slot, the card will actuate a card lever 40 which is pivoted on a stud 41 fixed in casting member 42. The counterclockwise movement of card lever 40 will permit the lip 43 of a cradle holder 44, pivoted on stud 45, to be disengaged from the end of the card lever. The cradle holder 44 supports a mercury switch 46 and upon being disengaged, the holder will pivot counterclockwise, due to the action of a spring 47, carrying the mercury switch until the switch reaches approximately a horizontal position and is closed circuit-wise. Referring to Fig. 17, with the recorder plugged in to the power lines the closure of the mercury switch will complete a circuit from line 48, the plug connection 49, fuse box 50, wire 51, the mercury switch card lever contact 46, wire 52, drive motor M, wire 53, fuse box 50, plug connection 49 and line 54. The motor M thus becomes operative to drive the several units of the recorder.

The motor calls into operation the various feeding instrumentalities for feeding the card vertically downward to a stop position, cross-feeding the card laterally across the recorder, interrupting the cross-feed of the card long enough so that the necessary registrations may be made and then resuming the cross-feed cycle during the latter portion of which eject rolls are operated to eject the card downward into a stacker box. At the end of a cross-feeding cycle a cam 55 (Fig. 2) fixed on a cross-feed shaft 56 will operate to pivot a stop lever 57 (Fig. 3) clockwise forcing a shaft 60 through a collar 59 to move upward sufficiently far to allow a bell crank 66, which is fastened to the rod 63, to engage, through a stud 67, the lip 43 and move the cradle holder 44 clockwise thereby opening the mercury switch and the motor circuit. As the lip 43 of the holder moves clockwise, the card lever 40 is pivoted clockwise by means of a spring 68 and prevents the cradle holder 44 from again pivoting counterclockwise and the driving motor remains inoperative.

Figure 2:
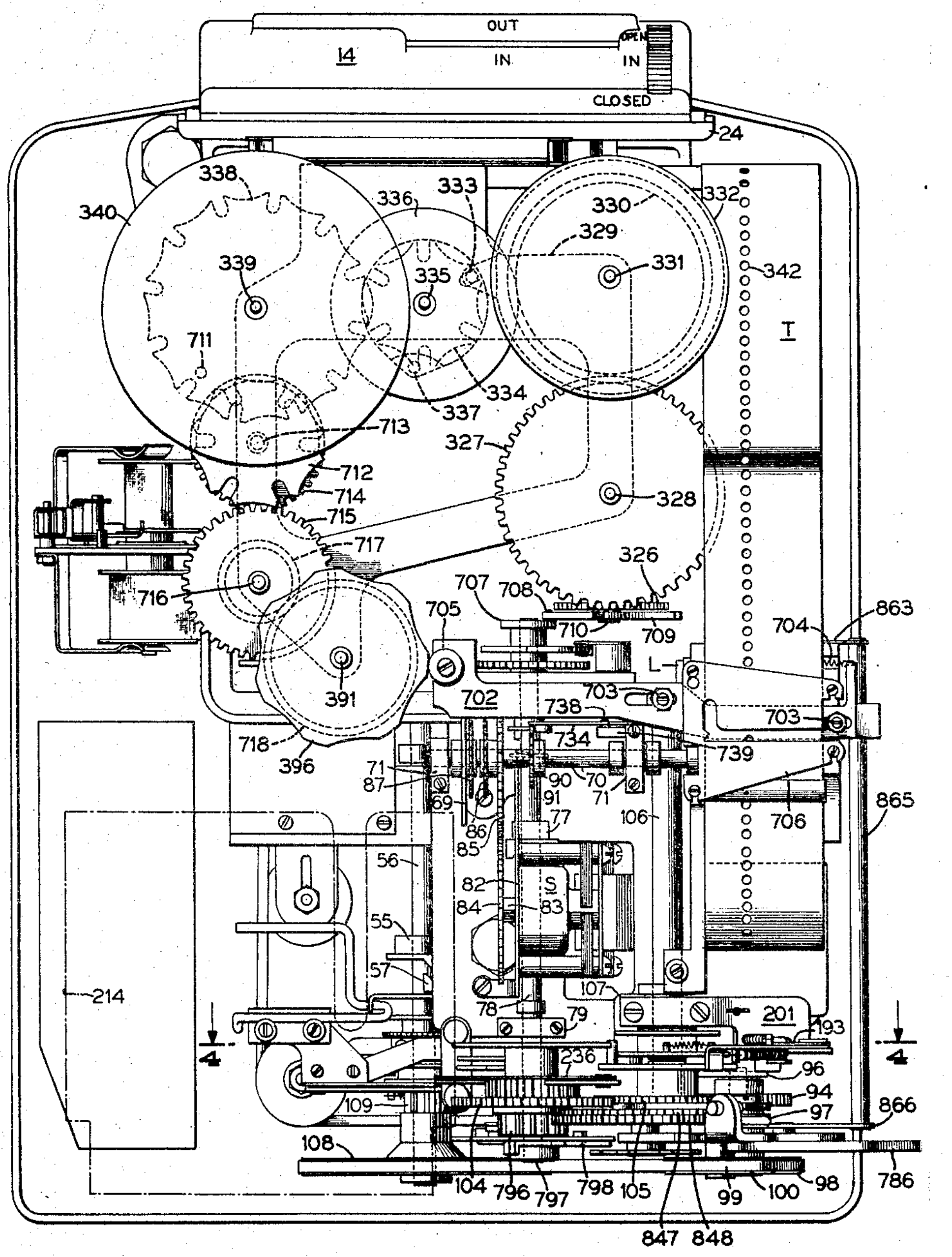
Fig. 2 is a front elevation view of the elapsed time recorder with the front cover removed.

On a timekeeping cycle, which is utilized to advance the time wheels, it becomes necessary to again energize the driving motor M. For this purpose there is provided a cam 69 which is journaled on an auxiliary drive shaft 70 journaled in a pair of casting members 71 as shown in Fig. 2. Cam 69 will permit a drop off of an arm 72 (Fig. 3) which is pivoted on a stationary stud 73, and is straddled at its other end by a start lever 74. The start lever 74 is pivoted on a fixed stud 75 and has its other end constrained in a collar 76 fastened on the shaft 60. Drop off of arm 72 will pivot start lever 74 clockwise and allow the spring 64 to move shaft 60 downward. This downward movement will pivot the bell crank 66 counterclockwise and cam the card lever 40 upward to permit the lip 43 of holder 44 to disengage and close mercury switch 46. Near the completion of the timekeeping cycle a cam 77, fastened on a hollow minute shaft 78 journaled in casting members 79 (Fig. 2), coacts with a stop lever 80 pivoted on a stationary stud 81. One end of the stop lever 80 is constrained within the collar 65 fastened on shaft 60 to effect the upward movement of shaft 60 and open the mercury switch 46. The driving motor M, then, becomes inoperative again at the end of each timekeeping cycle.

Referring to Fig. 2, the synchronous motor S, provided to operate the conventional time and the elapsed timekeeping instrumentalities, is shown mounted to a bracket plate 82 which is fastened to the main casting at the front of the machine. The synchronous motor S operates as long as the recorder is plugged into the power lines 48, 54 and through shaft 83 and gear 84 drives a gear 85, which is secured to a gear 86, and both of these gears are rotatable on the shaft 70. A gear 87 is fastened to the shaft 70 and the gears 87 and 86 cooperate with a pair of gears 88 and 89 rotatably mounted on the timekeeping cam 69 and in mesh with each other as shown in Fig. 3.

Cam 69 is advanced in a counterclockwise direction continuously by the synchronous motor S at a rate of approximately 3 degrees a minute and when arm 72 drops off the high portion of the cam, the driving motor M will be started in the manner previously described. The express purpose of starting the drive motor at the beginning of each timekeeping cycle is to provide a drive to the minute shaft 78 which in turn actuates the time wheels and a timekeeping cycle is taken once every minute as long as the recorder is in operation.

At the end of each timekeeping cycle shaft 60 is moved upward through cam 77, as previously described, and arm 72 is lifted. Immediately thereafter cam 69 is restored in a clockwise direction by a split worm gear 90 (Fig. 2) secured on the minute shaft 78 and in mesh with a gear 91 secured on the shaft 70. This action brings the high portion of cam 69 back under the arm 72 as the driving motor M is being de-energied.

Referring to Figs. 1, 2, 3 and 4, the basic drive comprises a gear 92 fast on the motor drive shaft 93 which meshes with and drives a gear 94. Gear 94 is fastened on a short shaft 95 which is journaled in a support bracket 96 attached to the main casting of the machine. Also fastened on the short shaft 95 is a small pulley 97 and a larger pulley 98. A belt 99 on pulley 98 drives an idler pulley 100 which is fastened to a short shaft 101 journaled in a suitable support plate. Attached to the shaft 101 is a pinion gear 103 which engages and drives another pinion gear **103*a* loose on a stud 103*b*. The pinion gear 103*a* engages and drives a gear 105 loose on a computing shaft 106 journaled between the top of the main casting and a casting member 107 (Fig. 2). The gear 105 in turn engages and drives a time advance gear 104 loose on the minute shft 78**.

The belt 99 connects back to the motor pulley 98 around a feed pulley 108 which is fastened to a reamer shaft 109 loosely mounted on the cross-feed shaft 56. Suitable clutches are provided to connect the minute shaft, the computing shaft and the cross-feed shaft to their respective drive gears. Since the present invention is concerned only with the timekeeping cycle of the machine, the clutching in and operation of shafts 56 and 106 will not be described. Suffice it to say here that operation of the cross-feed shaft 56 will call into operation the various instrumentalities for selectively positioning the card laterally across the recorder in accordance with the positioning holes in the card so that the card will be stopped in the correct position for sensing, printing and punching operations. After the card is positioned the computing shaft 106 will be clutched in to operate the various instrumentalities for carrying out a computing cycle wherein the elapsed time for any period is computed by the well-known method of reversing or backing up of the elapsed time wheels an amount equal to the setting of these wheels at the beginning of the period. During a computing cycle when the card is at rest, the punching and printing mechanisms are operated to record on the card. Near the end of a computing cycle, the computing shaft controls a second clutching in of the cross-feed shaft 56 to feed the card the rest of the way across the recorder and into eject rolls which eject the card down into the stacker box 214 (Fig. 2).

The timekeeping instrumentalities, which are positioned across the middle portion of the recorder (not shown), are started into operation by the cam 69 (Fig. 3). Cam 69 is driven by the synchronous motor S and through levers starts the drive motor M as previously described. When the stop lever 80 is pivoted about stud 81 on a downward movement of the shaft 60, it will move out of the way of an interlock bell crank 231 (Fig. 4) and permit the bell crank to pivot about a stud 232 under the influence of a spring 233 fastened between a fixed bracket 234 and a drive member 235 pivoted to said bell crank 231.

The counterclockwise movement of bell crank 231 allows a latch ear thereon to clear the noses of a dog carrier arm 236, fixed on the hollow minute shaft 78, and a dog 237 pivoted on the dog carrier arm 236. A spring 238 fastened between the dog carrier arm and the dog forces the dog into engagement with a ratchet sleeve 239 fastened to the top side of continuously running gear 104 and as a result the drive is transmitted to the minute shaft 78. During the rotation of minute shaft 78 a stud 240, fastened on an interlock disc 241 which is fast on the minute shaft, will cam an extension 242 of the ball crank 231 to restore the bell crank so that the dog 237 and dog carrier arm 236 will be latched up at the end of one revolution. A detent arm 243 pivoted on stud 232 and under the influence of a spring 244 mounted in bracket 234 serves to detent the dog 237 in its latched position. The minute shaft 78 will make one revolution every minute taking only a fraction of a second to complete its cycle.

The type wheels for keeping and recording conventional time and their associated drive are not shown and will not be described. It will be understood that from the rotation of minute shaft 78 once each minute suitable Geneva gear trains will be actuated to advance the various conventional time wheels. The dial mechanism indicated at D on Fig. 1 is also driven from the minute shaft 78 through suitable Geneva gearing so that the units of minutes dial wheel 332, tens of minutes dial wheel 336 and the hour dial wheel 340 are advanced.

The foregoing described in general the operation of selected portions of the prior machine. The improvements of the present invention will now be set forth with particular reference to their relationship with the structure of the prior machine.

*Program unit*

The program unit is essential to the correct operation of the recorder in that it controls the advancement of the elapsed time wheels. It is clear that in order to obtain the correct elapsed time between any start and stop operation the elapsed time wheels must be in synchronization with the timekeeping wheels except where certain conditions arise. These conditions may be, for instance, a lunch period, a rest period or a similar out time. Under such a condition, the elapsed time wheels must be stopped for the exact length of the "out" or non-working period, in order to eliminate this period from accumulating elapsed time.

In addition to the clutching on and off of the elapsed time wheels, the program unit also controls the rapid advance of the elapsed time wheels to take care of overlapping shifts in accordance with the principles of the present invention.

The controlling means for the program unit is an endless brass tape T (Figs. 1 and 2) which is wound around a pair of guide members 341, **341*a*. The tape has a series of feed holes 342 which cooperate with a sprocket wheel 343 (Fig. 6) attached to the shaft 70. The shaft 70 is driven from the minute shaft 78 at the rate of one revolution per hour through the worm gear 90 and the gear 91. The sprocket wheel 343** in turn advances the tape one revolution in every 12 hours.

Figure 5:
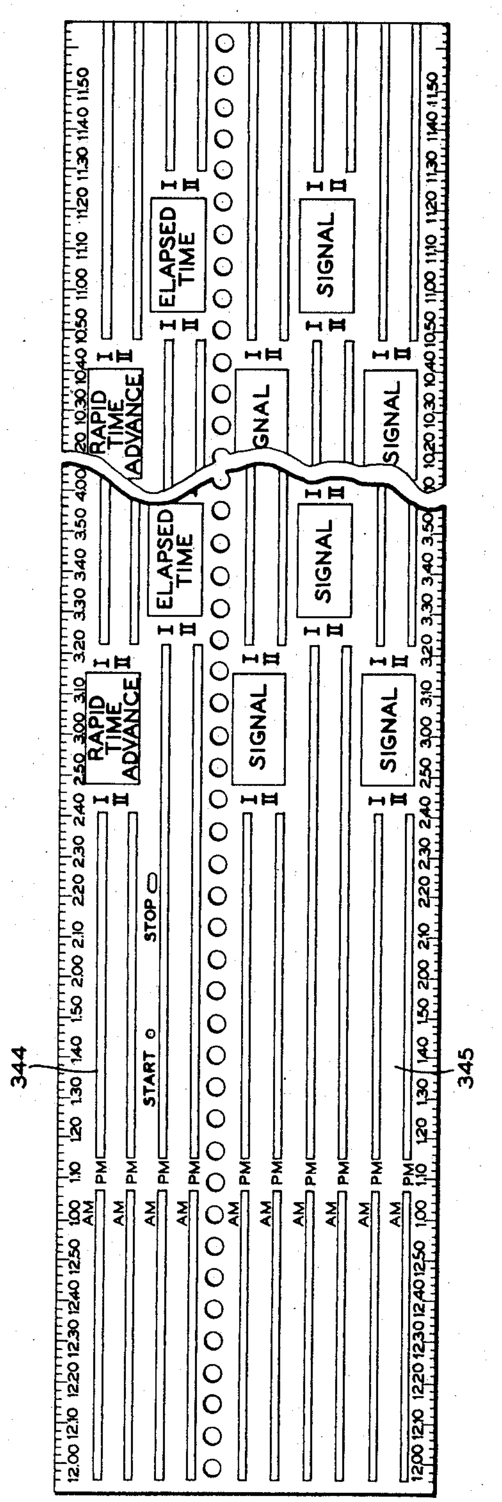
Fig. 5 is a detail view of a portion of the program tape.

Referring to Fig. 5, which shows in detail a portion of the tape, it can be seen that the tape is provided with No. 1 and No. 2 program channels 344. These channels may be prepunched at various time indicating positions to control the start-stop operations of an elapsed time computing cycle or a rapid time advance, the edges of the tape being provided with a scale of graduations marked off at minute intervals. The No. 1 program channels are used for a regular day schedule and the No. 2 program channels are used for special days. Pairs of No. 1 and No. 2 signal channels 345 are also provided for controlling bell ringing circuits or other special circuits for regular days and special days.

The sensing unit, indicated generally by the housing L in Fig. 1, is arranged to sense either of two complete program setups from one tape; the selection being automatically controlled by a day wheel 396. Essentially, five separate sensing units translate the coded perforations of an intermittently moving tape into suitable output lever displacements adaptable to the respective recorder operations.

Figure 6:
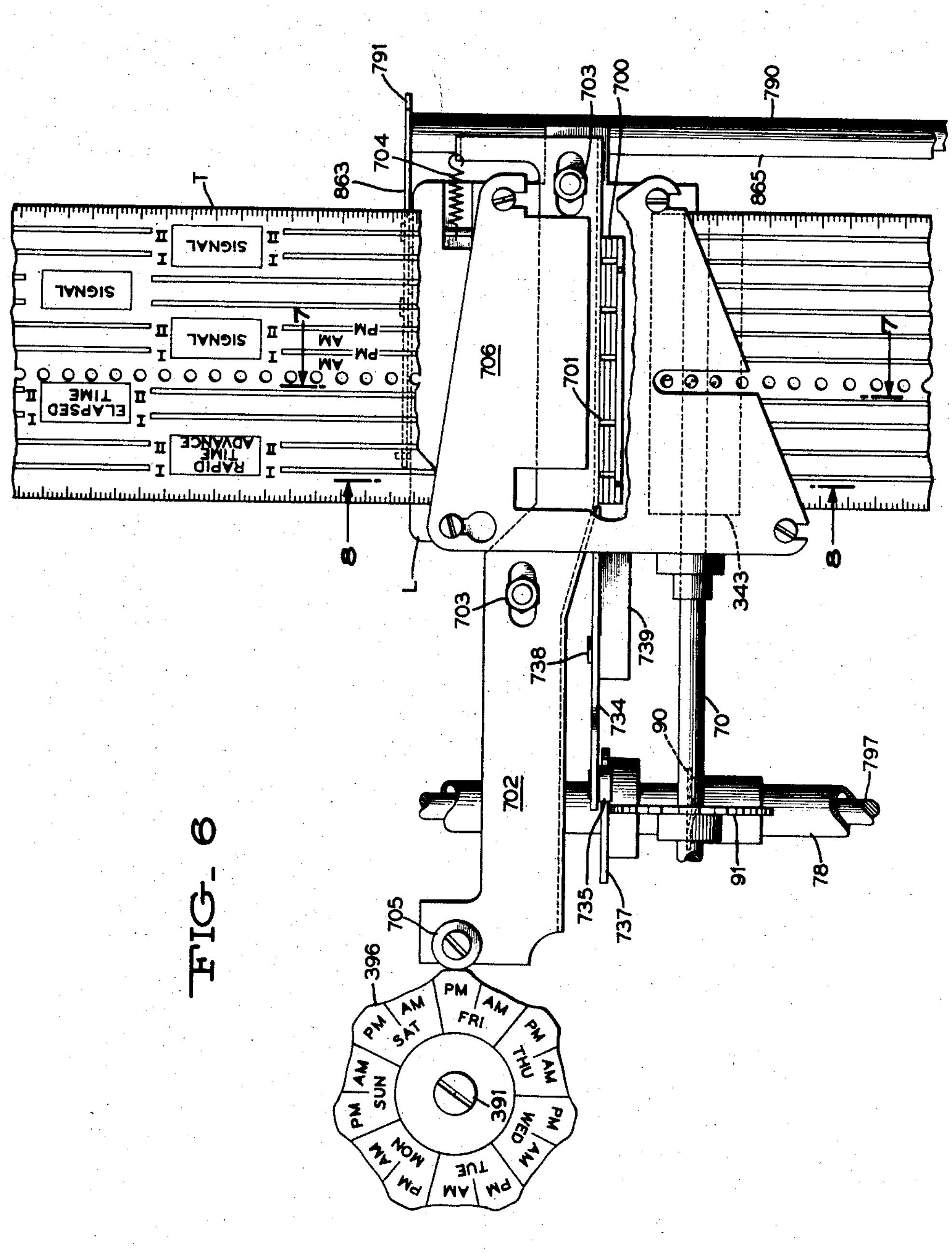
Fig. 6 is a view of the day and AM-PM cam mechanism of the program unit.

The five sensing units for (elapsed time, rapid time advance and three signal channels) are constructed adjacent to one another in such a fashion as to allow a common program bracket to guide laterally all of the sensing pins as a group. Referring to Fig. 6, the program bracket 700 comprises four adjoining plates each of which is provided with a plurality of slots 701 for carrying the individual sensing pins of the different sensing units. The program block is attached to the bottom of a link 702 which is slidably mounted on a pair of studs 703 fastened to suitable brackets on the sensing unit housing L. The link is biased toward the day wheel 396 by a spring 704 so that a roller follower 705 on the link will engage the periphery of the day wheel. The day wheel controls the lateral shifting of the link and program block to accordingly position the sensing wires in alignment with the No. 1 AM and PM program channels for a regular day schedule. If desired a suitable disc (not shown) having day representing slots into which insertable slugs could be inserted may be attached to the day wheel to program the sensing fingers for a special day schedule. The individual slots 701 assume a V shape with their larger extremities adjacent the sensing units to allow for the lateral movement of the sensing wires. A removable shield 706 is provided to retain the program tape against the program block and sensing fingers.

Referring to Fig. 2, the day wheel is driven from the dial mechanism D which as previously indicated is driven from the minute shaft 78. Fastened to the minute shaft is a disc 707 having a Geneva pin 708 which engages and drives a Geneva gear 709 rotatable on a stud 710. Secured to the Geneva gear is a pinion 326 which meshes with and drives a large gear 327 rotatable on a fixed stud 328 on frame member 329.

The gear 327 drives a gear 330 rotatable on a fixed stud 331 and fastened to the gear 330 is the units of minutes dial wheel 332 which is advanced one position every time the minute shaft 78 makes a revolution.

A cam disc 333 fastened to the units of minutes dial wheel drives a Geneva gear 334, rotatable on a fixed stud 335, and fastened to the Geneva gear 334 and driven thereby is the tens of minutes dial wheel 336.

The Geneva gear 334 also has fastened thereto a cam disc 337 which drives a Geneva gear 338 rotatable on a fixed stud 339. Fastened to the Geneva gear 338 and driven thereby is the hour dial wheel 340.

Attached to the Geneva gear 338 is a pin 711 which drives a Geneva gear 712 rotatable on a stud 713. Fastened to Geneva gear 712 is a gear 714 which meshes with and drives a gear 715 rotatable on a stud 716. Fastened to gear 715 is a smaller gear 717 which meshes with and drives a gear 718 rotatable on a stud 391 and integral with the day wheel 396 to advance same.

Since the present invention is concerned only with the keeping of elapsed time, only the elapsed time and rapid time advance sensing units need be described. Elapsed time by nature must be programmed to cover a certain period, and as such requires a separate stop and start signal. A single hole in the tape has been chosen as the start signal, and two consecutive holes the signal to stop and therefore the unit must recognize a single hole in turn activating the elapsed time mechanism; retain that condition until signaled to restore and subsequently stop the elapsed time mechanism by the double hole combination.

Figure 7:
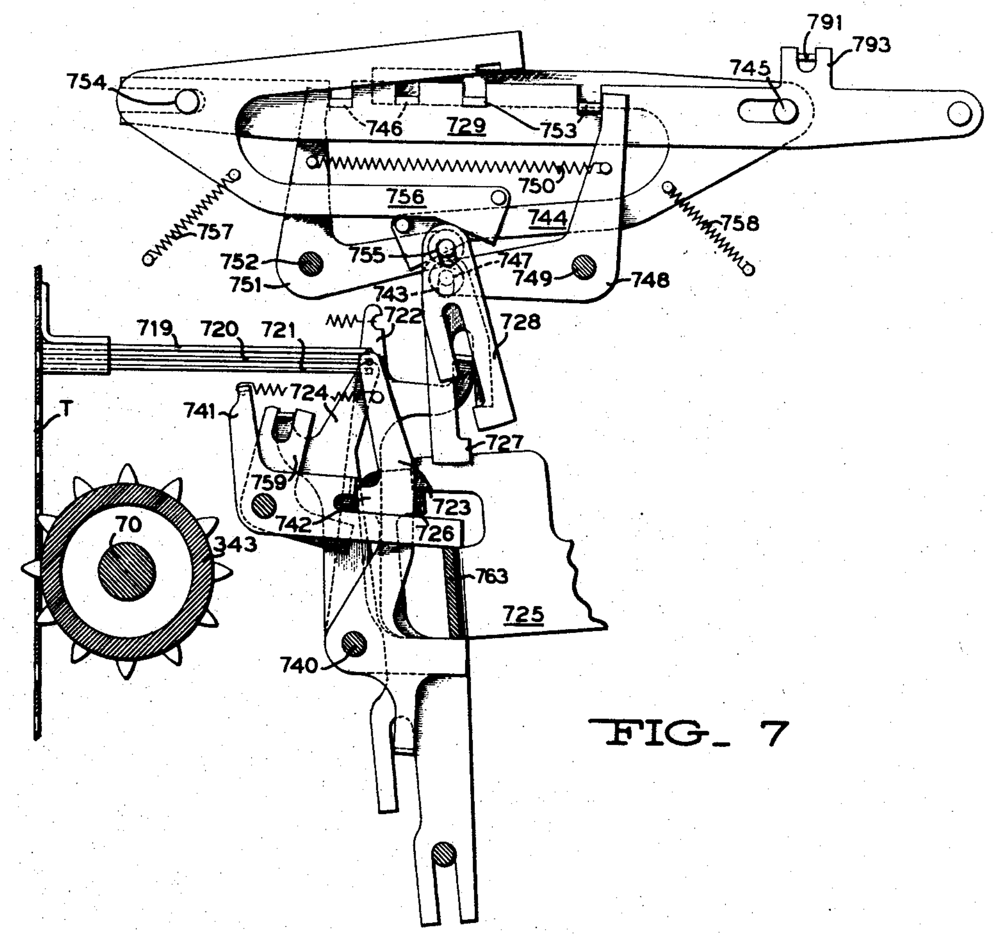
Fig. 7 is a sectional view taken on line 7—7 of Fig. 6 showing the sensing mechanism for the elapsed time channels of the program tape.

Referring to Fig. 7, three sensing pins 719, 720 and 721 attached respectively to spring biased pin levers 722, 723 and 724 search the elapsed time channel of the program tape for single and double hole indications. Following the reciprocal motion of a bail 725 the pins and associated levers are allowed to test for perforations once each minute in between tape advancements past the sensing station. A drive interposer 726 positioned by the pins will coact with the bail 725 to impart through output interposers 727 or 728 respectively a translational drive to an output arm 729. The output arm is linked to the elapsed time unit to control the operation of same.

Figure 9:
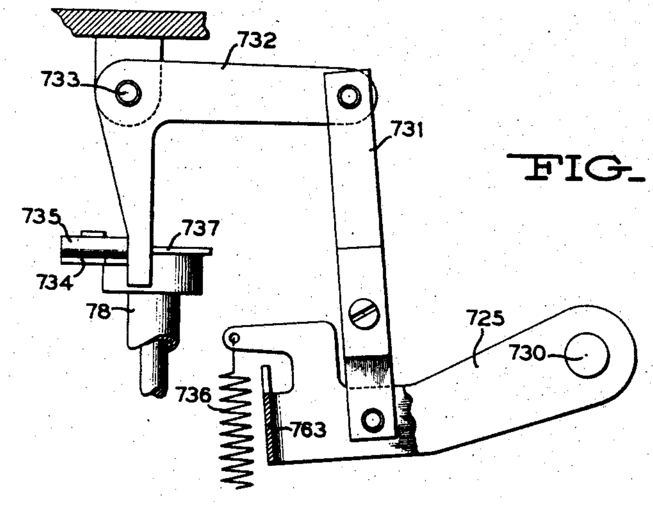
Fig. 9 is a detail view of the drive bail mechanism for the program sensing units.

In somewhat more detail, consider a single hole in the tape positioned opposite the pin 719. During this minute, bail 725 will make one cycle, the upstroke releasing the biased pin levers. Referring to Fig. 9, the bail 725 is pivoted on a stud 730 which is fastened to the inside of the left-hand side of the sensing unit housing L. The bail is connected by means of a link 731 to a bell crank 732 pivoted on a stud 733. The bell crank 732 is pivoted about the stud through a lever 734 and associated roller follower 735 which, under the influence of a spring, 736, follows the periphery of a cam 737 fastened on the minute shaft 78. The lever 734 is pivoted on a stud 738 fastened to a bracket 739 (Fig. 2) and its movement is translated to move the bail 725 up and down once each minute. With a single hole opposite pin 719 only selection 722 is allowed to pivot and in turn reposition output interposers 727 and 728 clockwise. The bail 725 at the top of its stroke approaches but doesn't contact interposer 728 and the output mechanism remains unaltered. The return stroke of the bail acts to restore lever 722, pin 719 and the two output interposers 727, 728.

The next minute tape advance will locate the single hole opposite the pin 720. As before bail 725 initiates a sensing cycle this time allowing active lever 723 to revolve about pivot 740. A delay latch 741 riding on top of the bail abuts a surface 742 on lever 723 delaying the pivoting action momentarily for reasons which will become evident in succeeding operations. To continue, the lower tail of lever 723 is hooked with the drive interposer 726, the lever being pivoted at 740, and the interposer pivots into the path of the ascending bail. With the drive interposer intervening, the bail is able to act on output interposer 727. The initial movement of the interposer, afforded by the elongated hole 743, cams a latch bracket 744 about a pivot stud 745 and free of an ear 746 protruding from the output arm 729. As the lower end of the elongated hole 743 moves upward it engages a pin 747 on a bell crank 748 pivoting the bell crank clockwise about a pivot stud 749. Bell crank 748, through a connecting spring 750, pulls a bell crank 751 clockwise about a pivot stud 752 and against the ear 746 forcing the output arm 729 to slide toward the right on studs 745 and 754. Simultaneously, as bell crank 751 moves clockwise a pin 755 thereon, extending through an elongated slot in interposer 728, drops causing the interposer to drop and allowing a latch bracket 756 riding on the upper cam surface of the interposer to pivot clockwise under the influence of a spring 757 to engage the ear 753 relatching the output mechanism. The movement of the output arm 729 will activate the elapsed time unit in a manner to be described. On the downstroke of the bail 725 the sensing pin 720 will be withdrawn from the tape preparatory to another tape advance.

During the third minute while the hole is in line with the sensing pin 721 no change is made in the output mechanism. The pin lever 724 merely pivots to the left as the bail 725 moves up and is restored on the downstroke. The output arm 729 will remain latched to the left holding the elapsed time unit in operation until a change is signaled by a double hole in the tape.

On elapsed time stop operation, with the first hole of the stop indication opposite the pin 719 the sensing unit will function as previously described. The next tape advance will position the two stop holes in line with the sensing pins 719, 720; however, as the bail 725 starts up only pin lever 722 is immediately free to follow since pin lever 723 will abut the delay latch 741 at 742. During this delay, pin lever 722 will have sufficient time to select or draw the interposer 728 into the line of action of bail 725 and at the same time pivot the interposer 727 aside. It should be remembered that interposer 728 and bell crank 751 were revolved and latched to the low position on the previous start operation. The delay latch 741 driven by the bail 725 will subsequently be pivoted clear of engaging surface 742 and as before allow the pin lever 723 to transfer the drive interposer 726 into an active status. This time the selected interposer 728 is driven up camming the latch bracket 756 free of output arm 729. The bell crank 751 is revolved counterclockwise drawing bell crank 748 counterclockwise against the ear 753 and the output arm 729 is repositioned to the left. The latch bracket 744 under the influence of a spring 758 follows the counterclockwise rotation of the bell crank 748 and interposer 727 and again engages the left ear 746 to lock the mechanism in place.

The next tape advance will align the two stop holes with sensing pins 720 and 721. Since the desired operation has already been completed and pin 720 is potentially active, some disabling means must be provided. The active pin lever 723 will again be delayed this time until the disabling pin lever 724 has pivoted a latch 759 in line with engaging surface 742. As a result the sensing pin 720 is held throughout the cycle locking the drive interposer 726 in place. The following cycle will, as before, only effect disabling lever 724 and sensing pin 721 with no outward change resulting.

In the event of tape breakage or removal it was desired to have the sensing unit remain static and under either of these conditions the disabling lever 724 and associated latch 759 will operate every cycle to prevent any movement of the output arm 729 and consequent operation of the elapsed time mechanism.

Figure 8:
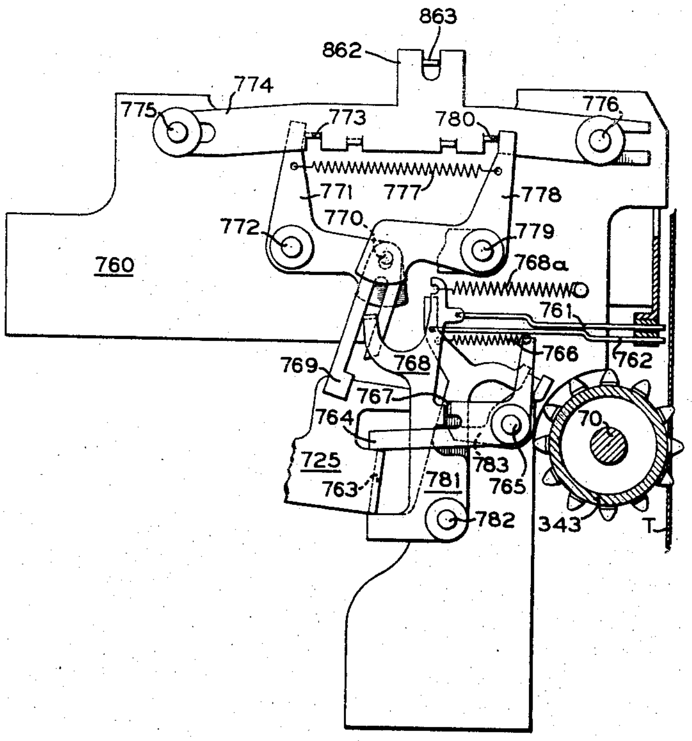
Fig. 8 is a sectional view taken on line 8—8 of Fig. 6 showing the sensing mechanism for the rapid time advance channels of the program tape.

The rapid time advance sensing unit, shown in Fig. 8, is located adjacent to the elapsed time sensing unit and is aligned to test for perforations in the rapid time advance channels of the tape. The mechanism is mounted on a plate 760 and comprises two sensing pins 761 and 762 which are under control of the program bracket 700 previously described. The overall drive is afforded by the bail 725, said bail having an arm 763 which extends laterally across all of the sensing units.

The operation of the rapid time advance sensing unit is very much the same as the elapsed time sensing unit just described. On the upward stroke of bail 725, a latch lever 764 is pivoted clockwise about a pivot stud 765 overcoming the tension of a return spring 766. As a result, the latching surface 767 on the lever is moved clear of the pin sensing lever 768 allowing said sensing lever to pivot clockwise under the influence of a spring 768a when a hole is encountered in the tape. The sensing lever is hooked with an interposer 769 causing said interposer to pivot counterclockwise about a pivot stud 770 and into the path of the bail. The bail contacts the interposer which in turn causes a bell crank 771, through the stud 770 thereon, to pivot counterclockwise about a pivot stud 772. The bell crank 771 will move clear of an ear 773 on an output arm 774 slidable on a pair of studs 775, 776. A spring 777 connected between the bell crank 771 and a bell crank 778 draws the bell crank counterclockwise about a pivot stud 779. The upper extremity of the bell crank 778 will engage an ear 780 on the output arm displacing the arm to the left or away from the tape.

As will be seen, a single impulse to the rapid time advance unit will carry out a rapid time advance cycle and no latch mechanism or stop signal is necessary and only a single hole is required in the rapid time advance channel of the tape.

Restoration is accomplished on the downstroke of bail 725 in the same manner as previously described for the elapsed time sensing unit. As before, in the event of tape breakage or removal the latching surface 767 on latch 764 will momentarily block movement of the pin lever 768. The disabling pin 762 and its associated pin lever 781 will move, the pin lever pivoting clockwise about a stud 782 on the upstroke of the bail and carrying with it a latch lever 783 pivoted on the stud 765. The latch lever is now in a position to block the pin lever 768 and thereby maintain the interposer 769 clear of the bail to prevent an erroneous rapid time advance cycle.

*Elapsed time cycle*

Figure 4:
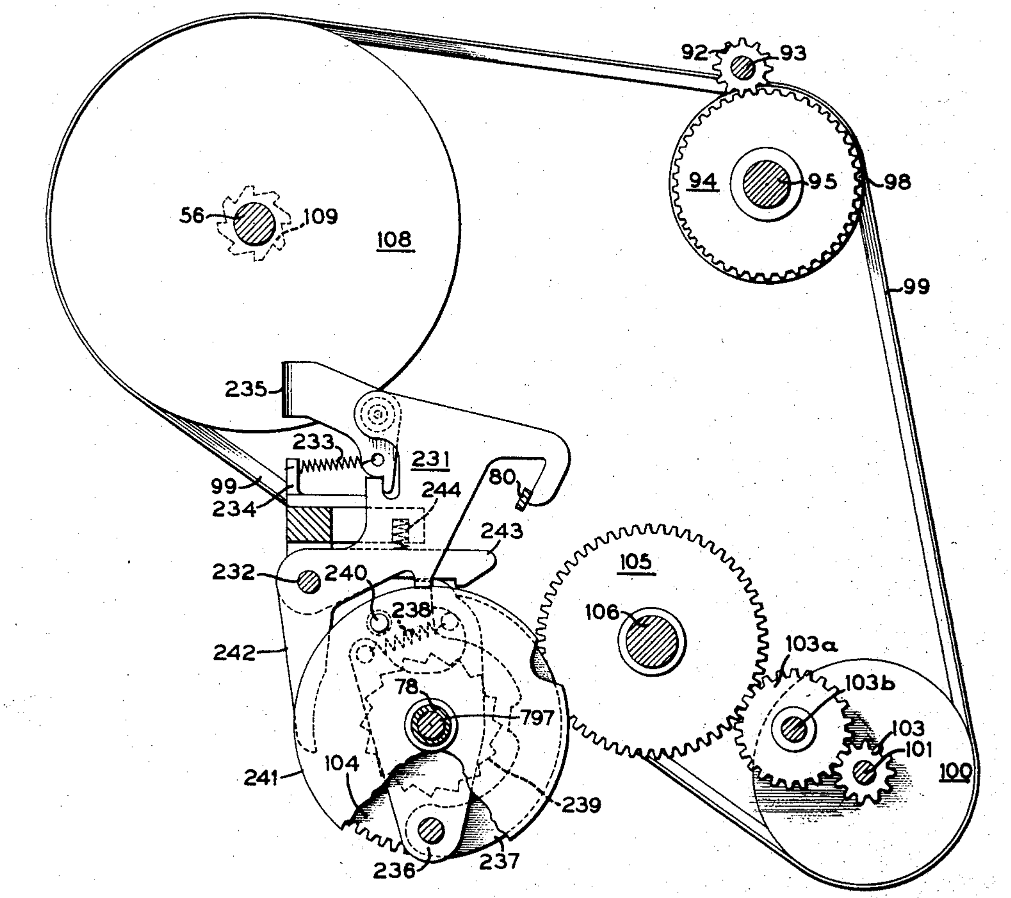
Fig. 4 is a sectional view taken on line 4—4 of Fig. 2, showing a top view of the main drive clutch with clutching elements of the computing shaft removed for clarity.
Figures 14, 15, 16:
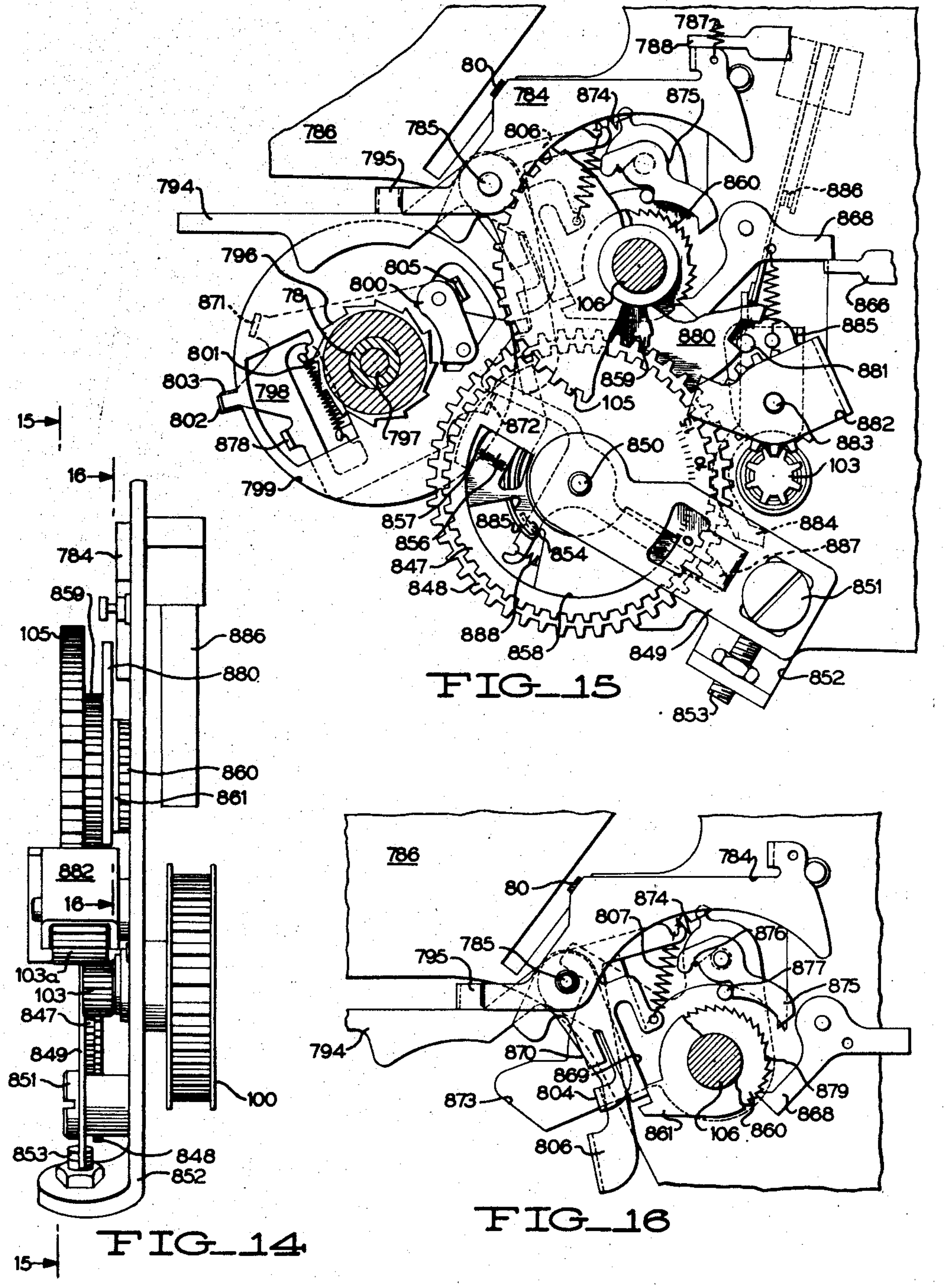
Fig. 14 is a right-hand side view of the elapsed time and rapid time advance clutch mechanisms.
Fig. 15 is a sectional view taken on line 15—15 of Fig. 14 showing the details of the elapsed time and rapid time advance clutch mechanisms.
Fig. 16 is a sectional view taken on line 16—16 of Fig. 14 showing details of the rapid time advance mechanism.

A normal elapsed time cycle occurs once every minute in accordance with appropriate program signals. Referring to Figs. 3 and 4, it will be remembered that the minute cam 69 and stop lever 80 operate each minute to effect the clutching of the minute shaft 78 to the ratchet sleeve 239 fastened to the top side of the continuously running gear 104. Referring to Fig. 15, the stop lever 80 etxends down and adjacent to the edge of an elapsed time trip lever 784 pivoted on a stud 785 fastened on a support plate 786. When the stop lever operates each minute it will also move clear of the trip lever for the purpose of allowing the trip lever to pivot counterclockwise under the influence of spring 787. However, before the lever is free to move an elapsed time program lever 788 must also be moved away from the trip lever. As shown in Fig. 1, the program lever is pivoted on a stud 789 fastened in the support plate 786 and has fastened to its extremity a vertically ascending rod 790. The rod is connected at its upper extremity to another program lever 791 pivoted on a stud 792 fastened on the top side of the sensing unit housing L. The other extremity of the program lever 791 is hooked into an ear 793 (Fig. 7) formed on the output arm 729 of the elapsed time sensing unit. It can be understood that when the output arm 729 is displaced toward the right away from the tape as a result of a start hole in the elapsed time channel of the tape, program lever 788 will be pivoted clockwise by the program lever 791 and rod 790 and the elapsed time trip lever 784 will be free to function.

With both levers 80 and 788 operated, the elapsed time trip lever 784 (Fig. 15) will pivot counterclockwise under the influence of spring 787 and a bell crank 794, overlapped by an ear 795 of the trip lever, will be similarly pivoted to unlatch the elapsed time clutch assembly. Said unlatching in turn transmits a rotational drive from a ratchet 796 to the elapsed time shaft 797 which is journaled within the minute shaft 78. As a result the various functions comprising an elapsed time cycle are initiated.

More specifically, the afore-mentioned elapsed time clutch is the conventional ratchet and dog modified to provide two diagonally positioned latching points making it a half revolution clutch. It consists of a plate 798 pinned to the elapsed time shaft 797, a disc 799 rotatably mounted on the same shaft, a dog 800 pivotally secured to the plate 798, and a throw spring 801 providing a tension link between the plate and disc. The remaining member, ratchet 796 is fastened to the underside of the continuously running gear 104. In the latched position one of the two protruding teeth 802, disposed 180 degrees apart on the periphery of the disc and one of two protruding teeth 803, disposed 180 degrees apart on the periphery of the plate, abut a latch lever portion 804 (Figs. 15 and 16) of the bell crank 794 holding the dog 800 free of ratchet 796.

Counterclockwise movement of the bell crank 794 will pivot the latch lever portion clear of the abutting clutch teeth allowing spring 801 to rotate disc 799 counterclockwise about the elapsed time shaft 797. Since the plate 798 remains stationary, said rotation will act to cam the dog into engagement with the ratchet transmitting its rotational drive to the elapsed time shaft 797 through the pinned plate 798. As the engaged mechanism rotates, a turned up ear 805 on the plate (Fig. 15) rides against the concave cam surface of the bell crank 794 affording the necessary clockwise restoring motion to the bell crank and the trip lever 784. The two are held in place by the restored levers 80 or 788 in a position to relatch the opposite pair of protuberances 802, 803, as the clutch assembly completes one-half revolution. The disc 799 is in that manner restored against the tension of spring 801 withdrawing the dog from engagement with the ratchet. The cycle is completed as an anti-kickback lever 806, under the influence of a spring 807, falls in behind the abutted teeth locking the clutch in place.

*Elapsed time drive*

Figure 10:
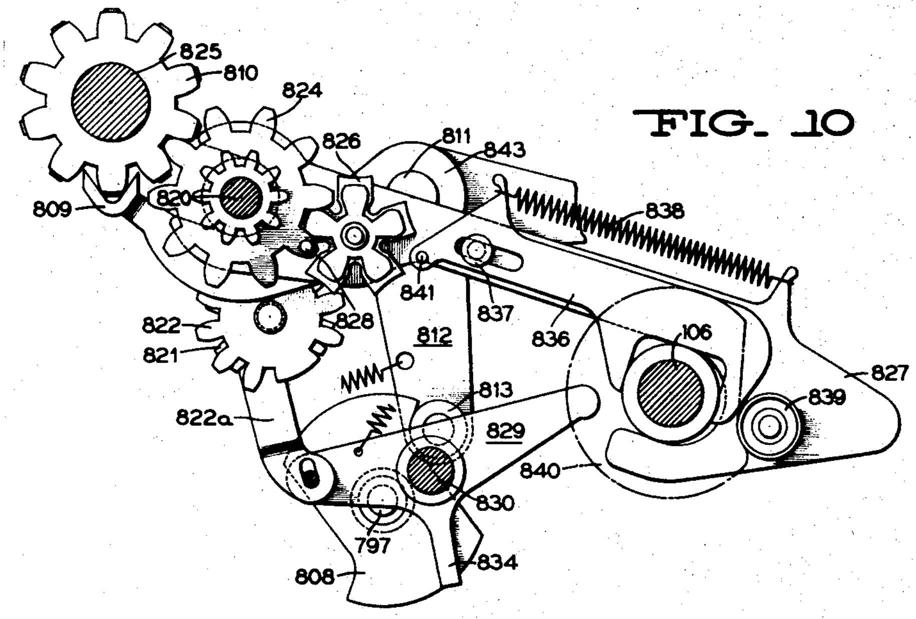
Fig. 10 is a detail view showing the elapsed time wheels drive mechanism.
Figure 13:
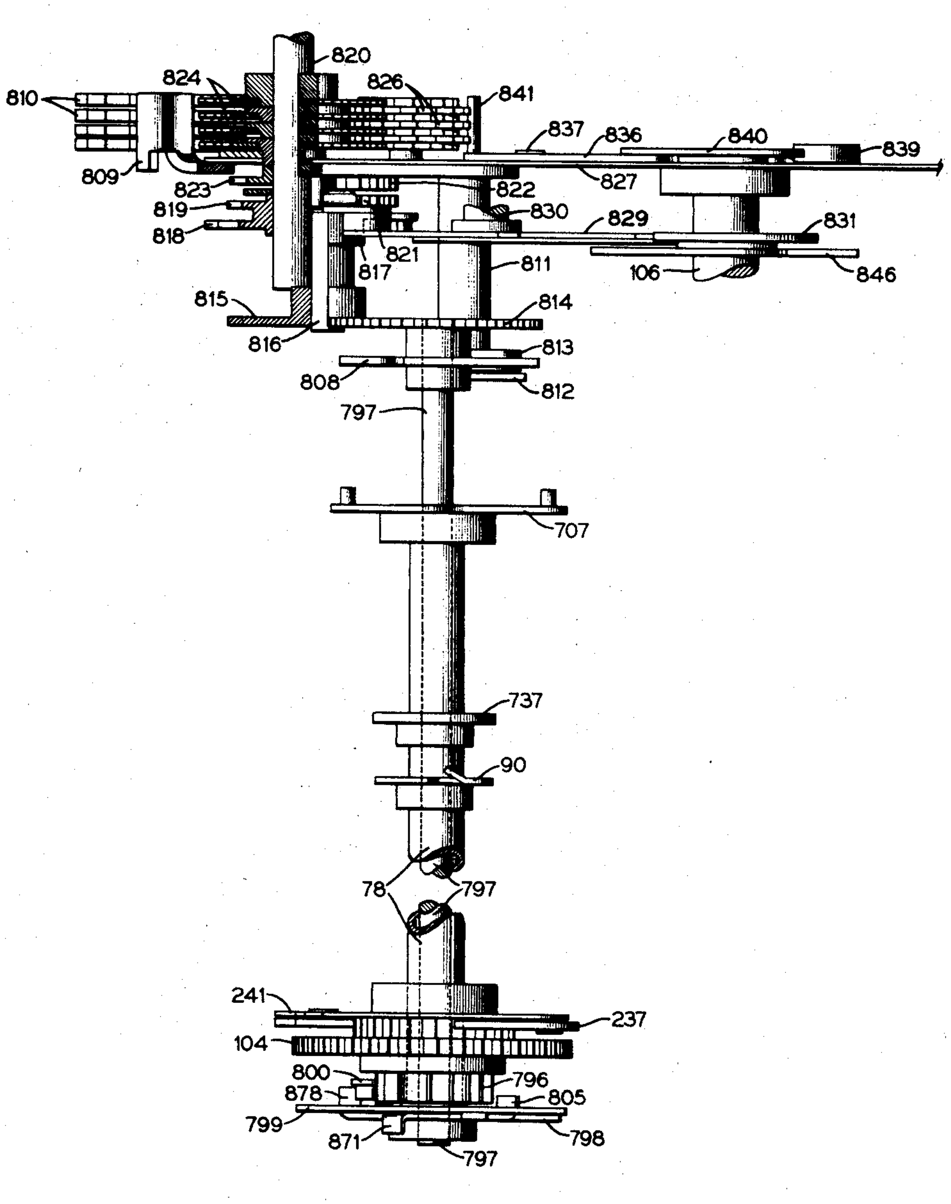
Fig. 13 is a front elevation view of the elapsed time wheel drive mechanism, the minute shaft clutch and the elapsed time shaft clutch.

The drive to the elapsed time wheels is initiated from the elapsed time shaft 797 which makes one-half revolution for each minute of advance, as described above. Referring to Figs. 10 and 13, during the early part of rotation of the elapsed time shaft, an aligned cam 808 operates to pivot a type wheel aligned 809 clear of the elapsed time type wheels 810 so that they are free for advancement. The aligner is fastened on a short pivot shaft 811 (Fig. 13) and also fastened to said shaft is an arm 812 and roller 813 which are operated by the cam to pivot the aligner clear of the type wheels.

An elapsed time drive gear 814 '(Figs. 11 and 13), assembled at the top of the elapsed time shaft 797, meshes with and drives a gear 815 fastened on a rotatable shaft 816. Assembled to the gear 815 is a Geneva drive disc 817 which engages a Geneva driven disc 818 which, with a gear 819, is assembled loosely on a shaft 820. The elapsed time intermediate gear 819 meshes with and drives an intermediate gear 821 which is assembled with a mutilated gear 822. This gear assembly is mounted on a retractable slide 822a for a purpose which will be described.

The multilated gear 822 drives a mating mutilated gear 823 (Fig. 12) which is assembled with an elapsed time gear 824, said assembly being fastened to the shaft 820. The gear 824 meshes with and advances the bottom elapsed time type wheel 810 (Fig. 13) loose on the shaft 825 and which is the hundredths type wheel. The tenths, units and tens type wheels are disposed above the hundredths type wheel and carry is effected between the type wheels by three transfer Geneva gears 826 assembled on a retractable slide 827.

Each of the drive gears 824 carries a pin 828 (Fig. 10) for advancing the related transfer Geneva to effect a carry. When the hundredths type wheel is advanced to the full revolution, the pin on its related gear 824 will engage the transfer Geneva for the next higher order to advance same along with the next higher order drive gear 824 and type wheel, the three higher order drive gears 824 being loose on the shaft 820. After the time feed is accomplished, the elapsed time aligner cam 808 restores the aligner 809 to retain the type wheels in their proper position.

It is to be noted that the half revolution of the elapsed time shaft occurs for each minute of time advance, yet the elapsed time type wheels are graduated in hundredths of hours. To take care of this condition a special schedule has been adopted which takes the following pattern:

| Minutes: | Decimals |
|---|---|
| 00 | .00 |
| 01 | 0.2 |
| 02 | .03 |
| 03 | .05 |
| 04 | .07 |
| 05 | .08 |
| 06 | .10 |
| 07 | .12 |
| 08 | .13 |
| 09 | .15 |
| 10 | .17 |
| 11 | .18 |
| 12 | .20 |

The mating mutilated gear 823 in coaction with mutilated gear 822 accomplishes a conversion of minutes to hundredths of hours through full teeth and missing teeth. The gear ratio involved in the elapsed time advance is such that one minute of time advance will cause mutilated gear 822 to go the equivalent of two spaces. If there are mating teeth on its mating gear 823, then gear 823 will be advanced two spaces and thus the hundredths type wheel will advance two spaces or the equivalent of two hundredths of an hour. Should the conversion come out so that there would be a missing tooth portion during the feed, it would advance only one tooth space, that is, gear 823 and the remaining movement of gear 822 would result in a sliding action and the hundredths type wheel would advance only one tooth space or the equivalent of one hundredths of an hour.

Figures 11, 12:
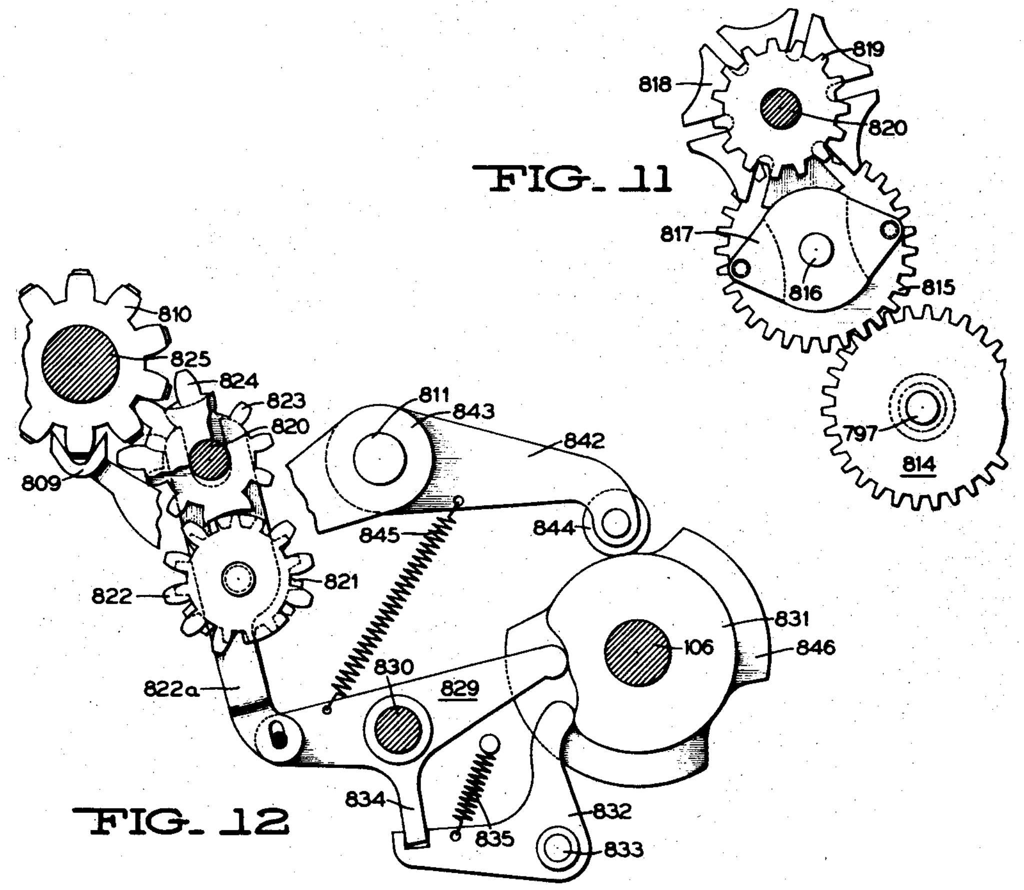
Fig. 11 is a fragmentary view showing a portion of the drive for the elapsed time wheels.
Fig. 12 is another fragmentary view showing a portion of the drive for the elapsed time wheels.

The reason for the retractable slides **822*a* and 827 is for removal of the Geneva portion from the type wheel drive train during a computation subtract cycle when the type wheels are backed up. Referring to Fig. 12, slide 822*a* has a forked end adapted to receive the shaft 820 and the other end of the slide is pivoted to a bell crank arm 829 pivoted on shaft 830. The other end of the bell crank arm rides on the periphery of a cam 831 fastened to the computation shaft 106 and during a computation cycle the cam will operate the bell crank arm and slide to retract the mutilated gear assembly 822 clear of the gear 823. Also riding on the periphery of the cam 831 is one end of a lever arm 832 pivoted on a stud 833. The other end of the lever arm is notched to receive an extension 834 of the bell crank arm and under the influence of a spring 835 the lever arm functions to prevent any separation between the mutilated gears 822, 823 during advancement. The cam 831** pivots the lever arm away from the extension to allow for retraction of the slide.

The slide 827 (Fig. 10) is forked at both ends and is positioned on sleeves on the shafts 820 and 106. Also hooked around the shaft 106 is a lock member 836 which lies adjacent to the slide and has an elongated slot therein to receive a stud 837 fastened on said slide. A spring 838 is connected between the slide and the lock member so that a follower 839 on the slide is urged against the periphery of a cam 840 fastened on the computing shaft. During a computation cycle, then, the cam operates to retract the slide to move the transfer Geneva gear assembly 826 out of mesh with the drive gears 824. A pin 841 on the locking member receives the retracted transfer Geneva gear assembly to maintain the gear relationship.

Referring to Fig. 12, an arm 842 is fastened to the aligner pivot shaft 811 through a sleeve 843 and carries a roller follower 844, which under influence of a spring 845, is urged to folow the periphery of a cam 846 fastened to the computing shaft. The cam 846 functions to pivot the aligner 809 free of the type wheels during a computation cycle.

*Rapid time advance*

The rapid advance mechanism is a means for sequentially operating the previously described elapsed time clutch to advance the elapsed time unit the required number of minutes in somewhat less than eight seconds. Referring to Fig. 15, the settable portion of the device comprises a dial gear 847, a gear 848 and a clamp 849 all of which are free on a pivot stud 850. The clamp is selectively meshed with the dial gear through a depressed notched sector portion and a screw 851 to lock the pair as a unit to the bracket plate 852. A screw 853 merely serves as an adjustment backing for the pair.

Hooked on to an ear 854 is a clock spring 855 which normally urges the gear 848 to move clockwise until a bent up ear 856 integral with the gear engages the edge 857 of a semi-circular slot 858 formed in the locked dial gear 847. The amount of rotation allotted to the gear 848, then, is controlled by the position of the dial within the fixed clamp. As shown in Fig. 15, the dial is meshed with the clamp at the zero indication placing the edge 857 adjacent to the ear 856 and locking the gear 848 against any movement at all. Therefore, any position other than zero will afford a proportional degree of rotation to the gear when released. This movement is transferred through a gear 859 to a count ratchet 860 and cam 861 (Figs. 15 and 16) free on the computing shaft 106 effecting a similar peripheral displacement to the count teeth and cam lobe in a ratio of one tooth per dial indication. Keeping this general picture in mind, a rapid advance operation will proceed in the following manner.

It will be remembered that when the rapid time advance sensing unit encounters a hole in the tape the output arm 774 (Fig. 8) is displaced to the left or away from the tape. Hooked into an ear 862 on the output arm is a program lever 863 which, as shown in Fig. 1, is pivoted on a stud 864 fastened on the top side of the sensing unit housing L. The lever 863 has fastened to its other extremity a vertical rod 865. Fastened to the bottom of the rod is another program lever 866 which is pivoted on the support plate 786.

Referring back to Figs. 15 and 16, lever 866 is the rapid time advance program lever which operates to pivot a detent dog 868 free from engagement with the count ratchet 860 thus allowing the ratchet to be driven counterclockwise by the clock spring through the gears 859, 848. If, for example, the dial 847 should be set at fifteen the count ratchet will be turned fifteen tooth spaces counterclockwise and redetented by the restored dog 868. A trip lever 869 previously held inoperative by the lobe on cam 861 is now free to pivot counterclockwise about the stud 785 and an arm 870 on the trip lever will cause the latch portion 804 and bell crank 794 to pivot counterclockwise.

As before an elapsed time cycle will be initiated causing the clutch assembly to function in the manner previously described. No mention has been made of the turned down ears 871 and 872 on the plate 798 but their utility will now become evident. Each half revolution of the plate permits one of the ears to strike a count ratchet drive arm 873 (Fig. 16) camming the arm clockwise against the tension of a restoring spring 874. Pivoted on the arm is a pawl 875 which is biased, by means of a spring 876, against a pin 877 fastened to the support plate 786. The pawl is normally held out of engagement with the count ratchet teeth; however, the circular motion of the drive arm 873 moves the pawl away from the fixed pin 877 allowing the pawl to snap into cooperative engagement with the count ratchet providing a throw suitable to restore the latter one tooth space. The detent dog 868 will secure the advance.

Either of the turned up ears 805 or 878 on the plate 798, depending on the position of the clutch, will attempt to restore the bell crank 794; however, with the trip lever 869 resting on the low dwell of the cam 861, such will not be possible. As soon as ear 805 or 878 passes the cam area of bell crank 794, the trip lever 869 and associated spring 807 will again act to pivot the latch portion 804 clear of the clutch protuberances 802, 803. Consequently, the elapsed time clutch assembly will be required to reposition the lobe of cam 861 under the trip lever 869 allowing it to engage and relatch the clutch assembly. As a result the elapsed time mechanism will have advanced the desired fifteen minutes in a matter of seconds. Obviously, while the count cam is sequentially ratcheted to the home position, the gear 848 is also driven counterclockwise cocking it for succeeding rapid time advance operations. Since the count ratchet drive arm 873 is operative every cycle, the ratchet has been provided with a relieved sector 879 (Fig. 16) comparable to the home position barring action between the pawl 875 and the ratchet at this time.

Referring to Fig. 15, a notched cam 880 associated with the count ratchet assembly provides a means for holding the drive motor circuit during a rapid time advance cycle. When the assembly is rotated counterclockwise at the beginning of the cycle, a pin 881 rigidly secured to a bail 882, pivoted on a stud 883, will be cammed from the low dwell of the cam 880 and the clockwise rotation imparted to the bail and transferred to an interposer 884 through the upturned ear 885 provides the lateral displacement necessary to close a pair of contacts 886. Referring to the wiring diagram (Fig. 17), it may be seen that closure of contacts 886 provides a parallel holding circuit for the motor M around the motor contacts 46. The pin 881 will ride on the high portion of the cam holding contacts 886 made until the last minute of advance is initiated, at which time the notch in the cam will have returned to the home position allowing the bail 882 to restore. To insure completion of the last clutch cycle, a hooked latch lever 887 pivoted on the stud 850 and biased by a spring 888 holds the interposer preventing it from following the restored bail 882. The turned down ears 871, 872 on the clutch plate 798 trip the latch lever just as the clutch assembly relatches releasing the interposer and opening the motor circuit contacts 886.

In regard to the timing of the rapid time advance program lever 866 in initiating a rapid time advance, the timing is controlled by the action of the program bail drive cam 737 (Fig. 9) fastened on the minute shaft 78. This timing is worked out so that the detent pawl 868 (Fig. 15) will be retracted from the ratchet and held withdrawn a sufficient length of time to permit the ratchet and cam assembly to be driven forward to the extent controlled by the member of minutes that are desired to be put into the elapsed time unit. This time is just long enough to permit this action and then the pawl is dropped again into the ratchet before the feeding of the first minute into the elapsed time unit so that this minute will not fail to be counted.

Thus, it can be understood that the program tape may be punched to carry out a rapid time advance cycle at say 4:45 p. m., for example, which is the start of a 15 minute punch in period for the second shift employees. With the dial mechanism set at 15 and the elapsed time program lever retracted for normal elapsed time operation, the rapid time advance mechanism will advance the elapsed time instrumentalities to 5:00 p. m. in just a few seconds. The rapid time mechanism is restored during this minute cycle of rapid advance and also at 8:45 on the tape two holes would be punched to restore the elapsed time program lever and prevent any further advancement of the elapsed time instrumentalities. Since the elapsed time printing, punching and computing mechanisms, which may take any suitable form, are controlled by the setting of the elapsed time wheels, the elapsed time for the second shift employees will be recorded and computed on the basis of a punch in time of 5:00 rather than the actual punch in time on the card which can vary anywhere between 4:45 and 5:00.

At 5:00 p. m. the 15 minute punch out period for the first shift employees begins and since the elapsed time program lever has not been operated again for elapsed time advancement, the elapsed time for the first shift employees will be recorded and computed on the basis of 5:00 rather than the actual punch out time on the card which would normally vary anywhere between 5:00 and 5:15. At 5:15 on the program tape both an elapsed time hole and rapid time advance hole would be sensed and during the minute cycle at 5:15 the rapid time advance mechanism would advance the elapsed time instrumentalities from 5:00 to 5:15 bringing the recorder up on time for normal operation. Normal elapsed time advancements will follow until the elapsed time program lever is restored.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An elapsed time recorder having elapsed time instrumentalities, advancing means therefor, clutching means operable to connect or disconnect said elapsed time instrumentalities with said advancing means, program means, means controlled by said program means for operating said clutching means to effect an advancement of said elapsed time instrumentalities, rapidly advancing means, means under control of said rapid advancing means for sequentially operating said clutching means a plurality of times, and means under control of said program means for initiating operation of said rapid advance means to effect a plurality of successive advancements of said elapsed time instrumentalities.

2. A cyclically operable elapsed time recorder having elapsed time instrumentalities, cyclically operable advancing means therefor, clutching means operable to connect or disconnect said elapsed time instrumentalities with said advancing means, program means, means controlled by said program means for operating said clutching means once each cycle to advance said elapsed time instrumentalities, rapidly advancing means, means under control of said rapid advancing means for sequentially operating said clutching means a plurality of times during a cycle, and means under control of said program means for initiating operation of said rapid advance means to effect a plurality of advancements of said elapsed time instrumentalities during a cycle.

3. An elapsed time recorder having elapsed time instrumentalities, advancing means therefor, clutching means operable to connect or disconnect said elapsed time instrumentalities with said advancing means, program means, means controlled by said program means for operating said clutching means to effect an advancement of said elapsed time instrumentalities, rapidly advancing means, means under control of said rapid advancing means for sequentially operating said clutching means a plurality of times, means under control of said program means for initiating operation of said rapid advance means to effect a plurality of successive advancements of said elapsed time instrumentalities, and settable means associated with said rapid advance means for controlling the number of said successive advancements.

4. A cyclically operable elapsed time recorder having elapsed time instrumentalities, cyclically operable advancing means therefor, clutching means operable to connect or disconnect said elapsed time instrumentalities with said advancing means, program means, means controlled by said program means for operating said clutching means once each cycle to advance said elapsed time instrumentalities, rapidly advancing means, means under control of said rapid advancing means for sequentially operating said clutching means a plurality of times during a cycle, means under control of said program means for initiating operation of said rapid advance means to effect a plurality of advancements of said elapsed time instrumentalities during a cycle, means for stopping the operation of said rapid advance means, and means for adjusting said stopping means to terminate operation of said rapid advance means after a predetermined number of successive advancements of said elapsed time instrumentalities.

5. A cyclically operable elapsed time recorder having elapsed time instrumentalities, advancing means therefor, clutching means operable to connect or disconnect said elapsed time instrumentalities with said advancing means, program means, means controlled by said program means for operating said clutching means once each minute to advance said elapsed time instrumentalities, rapidly advancing means, means under control of said rapid advancing means for sequentially operating said clutching means a plurality of times during a minute, and means under control of said program means for initiating operation of said rapid advance means to effect a plurality of advancements of said elapsed time instrumentalities during a minute.

6. A cyclically operable elapsed time recorder having elapsed time instrumentalities, a minute shaft, means for revolving said minute shaft once each minute, advancing means, an elapsed time shaft for advancing said elapsed time instrumentalities, clutching means operable to connect or disconnect said elpased time shaft with said advancing means, program means, means controlled by said program means for operating said clutching means once each minute to advance said elapsed time instrumentalities, rapidly advancing means, means under control of said rapid advancing means for sequentially operating said clutching means a plurality of times during one revolution of said minute shaft, and means under control of said program means for initiating operation of said rapid advance means to effect a plurality of advancements of said elapsed time shaft and elapsed time instrumentalities during a minute.

7. A cyclically operable elapsed time recorder having elapsed time instrumentalities, advancing means therefor, clutching means operable to connect or disconnect said elapsed time instrumentalities with said advancing means, program means, means controlled by said program means for operating said clutching means once each minute to advance said elapsed time instrumentalities, yieldable duriving means, driven means connected to said driving means, latching means normally engaging said driven means to prevent movement of both said driving means and driven means, means under control of said program means for operating said latching means to free said driving means and driven means for movement, and means under control of said driven means for sequentially operating said clutching means a plurality of times to effect a plurality of advancements of said elapsed time instrumentalities during a minue.

8. A cyclically operable elapsed time recorder having elapsed time instrumentalities, advancing means therefor, clutching means operable to connect or disconnect said elapsed time instrumentalities with said advancing means, program means, means controlled by said program means for operating said clutching means once each minute to advance said elapsed time instrumentalities, yieldable driving means, driven means connected to said driving means, latching means normally engaging said driven means to prevent movement of both said driving means and driven means, means under control of said program means for operating said latching means to free said driving means and driven means for movement, means under control of said driven means for sequentially operating said clutching means a plurality of times to effect a plurality of advancements of said elapsed time instrumentalities during a minute, and a stop member adjustable in the path of said driving means to control said driving means and driven means for a predetermined number of advancements of said elapsed time instrumentalities during said minute.

9. A cyclically operable elapsed time recorder having elapsed time instrumentalities, advancing means therefor, clutching means operable to connect or disconnect said elapsed time instrumentalities with said advancing means, program means, means controlled by said program means for operating said clutching means once each minute to advance said elapsed time instrumentalities, yieldable driving means, driven means connected to said driving means, latching means normally engaging said driven means to prevent movement of both said driving means and driven means from a home position, means under control of said program means for operating said latching means to free said driving means and driven means for continuous movement in one direction, stopping means adjustable to stop said driving means after predetermined movement in said one direction, means under control of said driven means for sequentially operating said clutching means to effect a plurality of advancements of said elapsed time instrumentalities, and means controlled by the sequential operation of said clutching means for resetting said driven means and driving means in a reverse direction toward said home position.

10. A cyclically operable elapsed time recorder having elapsed time instrumentalities, advancing means therefor, clutching means operable to connect or disconnect said elapsed time instrumentalities with said advancing means, program means, means controlled by said program means for operating said clutching means once each minute to advance said elapsed time instrumentalities, a ratchet and cam, yieldable driving means therefor, latching means normally engaging said ratchet to prevent movement of said driving means and cam from a home position, means under control of said program means for operating said latching means to free said ratchet, cam and driving means for continuous movement in one direction, stopping means adjustable to stop said driving means after predetermined movement in said one direction, means under control of said driven cam for sequentially operating said clutching means to effect a plurality of advancements of said elapsed time instrumentalities, and means controlled by the sequential operation of said clutching means for indexing said ratchet, cam and driving means in a reverse direction toward said home position.

11. A cyclically operable elapsed time recorder having elapsed time instrumentalities, a minute shaft, means for revolving said minute shaft once each minute, an elapsed time shaft for advancing said elapsed time instrumentalities, advancing means, a half-revolution clutch operable to connect said elapsed time shaft with said advancing means, program means, means controlled by said program means for releasing said clutch once each minute to advance said elapsed time instrumentalities, means for latching said clutch at the end of each half revolution, auxiliary advancing means normally held inoperative, means under control of said program means for releasing said auxiliary advancing means for movement, control means operated by said auxiliary advancing means, and means rendered operative by said control means for sequentially operating said clutch latching means to effect a plurality of successive advancements of said elapsed time instrumentalities during one revolution of said minute shaft.

12. A cyclically operable elapsed time recorder having elapsed time instrumentalities, a minute shaft, means for revolving said minute shaft once each minute, an elapsed time shaft for advancing said elapsed time instrumentalities, advancing means, a half-revolution clutch operable to connect said elapsed time shaft with said advancing means, program means, means controlled by said program means for releasing said clutch once each minute to advance said elapsed time instrumentalities, means for latching said clutch at the end of each half revolution, auxiliary advancing means normally held inoperative, means under control of said program means for releasing said auxiliary advancing means for movement, settable means for controlling the extent of movement of said auxiliary advancing means, control means operated by said auxiliary advancing means, means rendered operative by said control means for sequentially operating said clutch latching means to effect a plurality of successive advancements of said elapsed time instrumentalities during one revolution of said minute shaft, and means dependent on the extent of movement of said auxiliary advancing means and under control of said clutch for operating said control means to terminate the sequential operation of said clutch.

13. A cyclically operable elapsed time recorder having elapsed time instrumentalities, a minute shaft, means for revolving said minute shaft once each minute, an elapsed time shaft for advancing said elapsed time instrumentalities, advancing means, a half-revolution clutch operable to connect said elapsed time shaft with said advancing means, program means, means controlled by said program means for releasing said clutch once each minute to advance said elapsed time instrumentalities, means for latching said clutch at the end of each half revolution, spring loaded advancing means, pawl and ratchet means normally holding said advancing means inoperable, means under control of said program means for operating said pawl to release said ratchet and advancing means for movement, a cam associated with said ratchet for movement therewith, spring loaded means normally held inoperative by said cam and rendered operable upon movement of said cam to sequentially operate said clutch latching means to effect a plurality of successive advancements of said elapsed time instrumentalities during one revolution of said minute shaft, adjustable means for controlling the extent of movement of said advancing means, ratchet and cam, and means operable upon each successive operation of said clutch to index said ratchet, cam and advancing means backward, said cam restoring said spring loaded means to an inoperative state after a predetermined number of successive advancements of said elapsed time instrumentalities.

14. A cyclically operable elapsed time recorder having elapsed time instrumentalities, a minute shaft, means for revolving said minute shaft once each minute, an elapsed time shaft for advancing said elapsed time instrumentalities, advancing means, a half-revolution clutch operable to connect said elapsed time shaft with said advancing means, program means, means controlled by said program means for releasing said clutch once each minute to effect a minute advance of said elapsed time instrumentalities during less than one revolution of said minute shaft, spring loaded advancing means normally held inoperative, means for adjusting said advancing means for a predetermined number of successive minute advancements of said elapsed time instrumentalities, means under control of said program means for releasing said advancing means for operation, means rendered operable by the operation of said advancing means for sequentially operating said clutch during less than one revolution of said minute shaft to effect the predetermined number of successive minute advancements of said elapsed time instrumentalities, and means operated upon each successive operation of said clutch for resetting said advancing means and clutch operating means.

References Cited in the file of this patent

UNITED STATES PATENTS

| | | |
|---|---|---|
| 2,631,666 | Rixford et al. | Mar. 17, 1953 |
| 2,752,769 | Clark | July 3, 1956 |

UNITED STATES PATENT OFFICE

CERTIFICATE OF CORRECTION

Patent No. 2,935,252 May 3, 1960

Donald W. Brearley

It is hereby certified that error appears in the printed specification of the above numbered patent requiring correction and that the said Letters Patent should read as corrected below.

Column 4, line 43, for "de-energied" read -- de-energized --; line 59, for "shft" read -- shaft --; column 5, line 36, for "ball" read -- bell --; column 7, line 51, after "selection" insert -- lever --; column 10, lines 49 and 50, for "aligned", each occurrence, read -- aligner --; column 11, line 20, in the tabulation, for "0.2" read -- .02 --; column 12, line 9, for "folow" read -- follow --; column 13, line 62, for "member" read -- number --; column 15, line 62, for "duriving" read -- driving --.

Signed and sealed this 18th day of April 1961.

(SEAL)
Attest:

ERNEST W. SWIDER
Attesting Officer

DAVID L. LADD
Commissioner of Patents